United States Patent [19]

Tobita et al.

[11] Patent Number: 4,723,287

[45] Date of Patent: Feb. 2, 1988

[54] DEMODULATING SYSTEM FOR MULTIVOICE SYSTEM

[75] Inventors: Katsumi Tobita; Tamaki Yoshimoto, both of Soma, Japan

[73] Assignee: Alps Electric Co., Ltd., Japan

[21] Appl. No.: 914,008

[22] Filed: Oct. 1, 1986

[30] Foreign Application Priority Data

Oct. 2, 1985 [JP] Japan .................................. 60-219957

[51] Int. Cl.4 .............................................. H04H 5/00
[52] U.S. Cl. ........................................ 381/4; 381/13; 358/144
[58] Field of Search ...................... 358/86, 144; 381/3, 381/2, 4, 13

[56] References Cited

U.S. PATENT DOCUMENTS

| | | | |
|---|---|---|---|
| 3,659,041 | 4/1972 | Kitaoka et al. | 381/3 |
| 4,272,788 | 6/1981 | Ogita | 381/3 |
| 4,368,354 | 1/1983 | Forihata et al. | 358/144 |
| 4,496,979 | 1/1985 | Yu et al. | 358/144 |
| 4,577,226 | 3/1986 | Avins | 358/144 |
| 4,603,349 | 7/1986 | Robbins | 358/86 |
| 4,611,226 | 9/1986 | Buhse et al. | 358/144 |
| 4,646,150 | 2/1987 | Robbins et al. | 358/144 |

Primary Examiner—Forester W. Isen
Attorney, Agent, or Firm—Guy W. Shoup

[57] ABSTRACT

A demodulating system for the multivoice TV system, which is constituted so that a tuner is tuned to receive the sum signal and the difference signal of an aural signal and a pilot signal which are transmitted together with a video signal, the selected signal is given to an intercarrier demodulator and an aural signal band-pass filter, the intercarrier demodulator provides a beat signal corresponding to the difference between the video carrier and the sound subcarrier, the beat signal is demodulated to obtain the sum signal, and the sound subcarrier provided by the sound signal band-pass filter is demodulated to obtain the difference signal and the pilot signal. The demodulating system is intended to eliminate disturbing signals included in the composite signal and buzzing, and to obviate the malfunction of the MPX decoder due to the disturbing signal having the same frequency as that of the pilot signal.

1 Claim, 4 Drawing Figures

DEMODULATING SYSTEM FOR MULTIVOICE SYSTEM

BACKGROUND OF THE INVENTION

1. Field of the Invention

The present invention relates to a demodulating system for the multivoice television system and, more specifically, to a demodulating system for the CATV system prevailing in the United States of America.

2. Description of the Prior Art

The multivoice television broadcasting prevailing in the United States of America is of the BTSC system. FIG. 2 shows the spectrum of a baseband signal of the BTSC system. The sum signal (L+R), the difference signal (L−R), the pilot signal, the SAP signal and the PRO-CH signal of an aural signal shown in FIG. 2 are transmitted after frequency modulation together with a video signal. FIG. 3 shows a multivoice broadcast receiving system. Referring to FIG. 3, in order to receive the aural signal, a channel is selected to convert the frequency of the aural signal into a corresponding intermediate frequency by a tuner 1, then the intermediate frequency signal is given to a voice demodulator 9, which demodulates the intermediate frequency signal to obtain the composite signal of the sum signal and the difference signal. The composite signal is decoded by a MPX decoder 10 to provide an L-signal and an R-signal.

The CATV broadcasting, as well as the conventional TV broadcasting, transmits signals by the multivoice BTSC broadcasting system. The CATV broadcasting employs the PAY broadcasting system (chargeable broadcasting), in which a receiver receives signals through a specific contracted channel contracted between the receiver and the station. To make impossible the unlicensed reception of a broadcast through channels other than the contracted channel, video signals are scrambled for transmission and timing pulses for restoring the scrambled video signals are superposed on the video signals through amplitude modulation. In such a CATV broadcasting system, the video signals and the amplitude-modulated timing pulses disturb the aural signals. The multivoice broadcast market, in particular, requires stereophonic PAY broadcasting, and those jamming signals need to be eliminated for the satisfactory reception of a stereophonic broadcast.

FIG. 4 shows a conventional demodulating system for the multivoice system. In FIG. 4, there are shown a tuner 1, an IF band-pass filter 2, an intercarrier demodulator 6, an intercarrier band-pass filter 7 and an FM detector 8. An intermediate frequency TV signal selected and frequency-converted by the tuner 1 is filtered by the IF band-pass filter 2 to eliminate signals transmitted from the adjacent stations which disturb the TV signal. The filtered TV signal is given to the intercarrier demodulator 6, and then the intercarrier demodulator 6 provides a signal having a frequency corresponding to the difference between the frequency of the video carrier and that of the sound carrier, namely, a beat signal. In the case of the NTSC system, the frequency of the beat signal is 4.5 MHz. The beat signal is employed as an intermediate frequency sound signal. The output signal of the intercarrier demodulator 6 is filtered by the intercarrier band-pass filter 7 to eliminate a video signal component other than the beat signal to give a beat signal having only a sound signal component to the FM detector 8, where the composite signal of the difference signal and the sum signal is demodulated. The composite signal is given to an MPX decoder, not shown, to obtain the L-signal and the R-signal. This demodulating is called as the intercarrier receiving system.

In modulating the intercarrier, namely, in generating the beat signal, by the intercarrier receiving system, the video signal is superposed on the intercarrier and is given as a disturbing signal to the 1fH, 2fH, 3fH, ... and nfH of the composite signal to produce an annoying noise (buzzing) in the stereophonic sound. Since the 1fH of the composite signal has a disturbing signal, a disturbing signal of the same frequency as that of the pilot signal affects adversely to the MPX decoder. For example, the MPX decoder is caused to perform a stereophonic action by the disturbing signal during the reception of an ordinary broadcast or the phse of the pilot signal is deviated during the reception of a stereophonic broadcast. Furthermore, in most cases, the tuner is provided as an individual CATV converter and the composite signal is not provided during the channel selection of the CATV converter, which produces channel selection noise (pop noise).

SUMMARY OF THE INVENTION

In view of the problems of the conventional demodulating system for the multivoice system, it is an object of the present invention to provide a demodulating system for the multivoice system, comprising a combination of a voice demodulator of the intercarrier system and a voice demodulator of the split carrier system, and capable of eliminating the disturbing signals of the 1fH, 2fH, ... and nfH of a composite signal, eliminating buzzing, and obviating the malfunction of the MPX decoder due to a disturbing signal having the same frequency as that of the pilot signal.

In order to achieve the object of the invention, a demodulating system for the multivoice system is constituted so that a tuner is tuned to receive the sum signal and the difference signal of an aural signal and a pilot signal which are transmitted together with a video signal, the selected signal is given to an intercarrier demodulator and an aural signal band-pass filter, the intercarrier demodulator provides a beat signal corresponding to the difference between the video carrier and the sound subcarrier, the beat signal is demodulated to obtain the sum signal, and the sound subcarrier provided by the sound signal band-pass filter is demodulated to obtain the difference signal and the pilot signal.

This demodulating system eliminates the disturbing signals of the 1fH, 2fH, 3fH, ... and nfH produced by the intercarrier demodulator by obtaining only the sum signal (L+R) having a frequency lower than that of the disturbing signal of the 1fH through demodulation by the demosulator of the intercarrier system and eliminating the difference signal (L−R) having a frequency higher than that of the disturbing signals of other fHs and the pilot signal by the filter, and obtains the difference signal (L−R) and the pilot signal by a demodulator of the split carrier system which does not produce any distrubing signal to eliminate the buzzing noise attributable to the disturbing signals and to prevent the malfunction of the MPX decoder.

The above and other objects, features and advantages of the present invention will become more apparent from the following description of the preferred embodiment thereof taken in conjunction with the accompanying drawings.

DESCRIPTION OF THE PREFERRED EMBODIMENT

Figure 4:
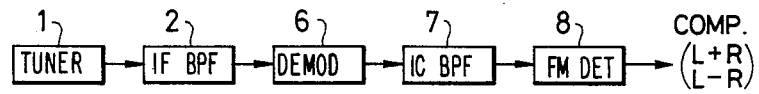
FIG. 4 is a block diagram of a conventional demodulating system for the multivoice system.

A preferred embodiment of the present invention will be described hereinafter with reference to FIG. 1, in which parts similar to those of the conventional demodulating system described with reference to FIG. 4 are denoted by the same reference numerals and the description thereof will be omitted to avoid duplication.

Figure 1:
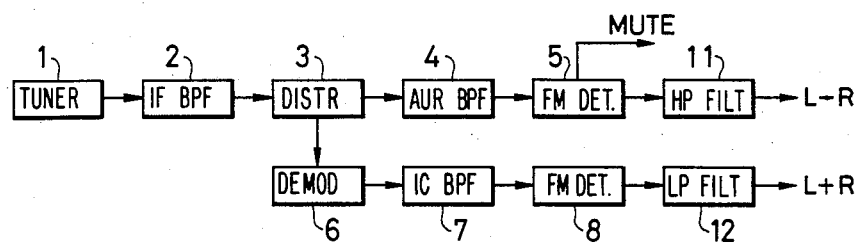
FIG. 1 is a block diagram of a demodulating system for the multivoice system, in a preferred embodiment, according to the present invention.
Figure 2:
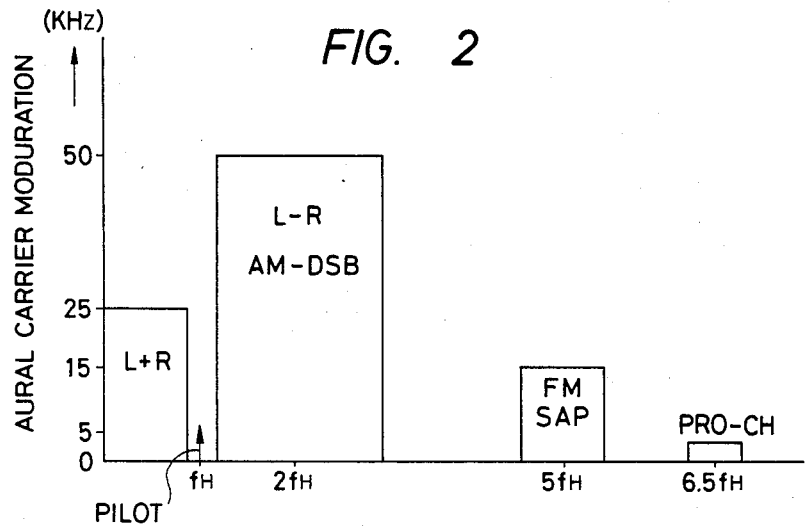
FIG. 2 is a diagram showing the spectrum of a composite signal.
Figure 3:
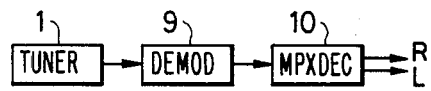
FIG. 3 is a block diagram of a conventional stereophonic demodulating system.

Referring to FIG. 1, there are shown a distributor 3, a aural signal band-pass filter 4 and an FM detector 5. The frequency of a signal selected by the tuner 1 is converted into an intermediate frequency, and an intermediate frequency signal is filtered by the IF band-pass filter 2 to eliminate the noises of the adjacent channels. The distributor 3 gives the intermediate frequency signal to the intercarrier demodulator 6 and the aural siganl band-pass filter 4. The intermediate frequency signal given to the intercarrier demodulator 6 is detected by the FM detector 8. The FM detector 8 gives a composite signal including the sum signal (L+R) and the difference signal (L−R) to the low-pass filter 12, and then the low-pass filter 12 provides only the sum signal of the aural signal.

On the other hand, the intermediate frequency signal given by the distributor 3 to the aural siganl band-pass filter 4 is filtered by the aural signal band-pass filter 4, which gives only the aural signal component among the TV signal components to the FM detector 5. The FM detector 5 demodulates the aural signal component into a composite signal, and then the composite signal is given to the high-pass filter 11. The high-pass filter 11 arrest the sum signal and provides the pilot signal and the difference signal. Thus the composite signal including the pilot signal and the difference signal is demodulated by the split carrier system, and hence the disturbing signals of 1fH, 2fH, 3fH, . . . and nfH which are produced in demodulation of the composite signal by the intercarrier system are not produced. In the demodulation of the composite signal by the split carrier system, since an aural signal of an intermediate frequency is given to the FM detector 5, the frequency of the signal given to the FM detector 5 varies during channel selection and the level of the input signal drops. Therefore, an accurate mute control signal can be produced by combining the frequency variation and the level variation, so that the pop noise which is produced by channel selecting operation can be eliminated.

As apparent from the foregoing description, since the demodulates system for the multivoice system demodulates the sum signal by the intercarrier system and demodulates the pilot siganl, the difference signal, the SAP signal and the PRO-CH signal by the split carrier system, the disturbing signals of the same frequency as that of the pilot signal and of frequencies equal to multiples of the frequency of the pilot signal produced by the intercarrier demodulator can be removed by a filter which passes only the aural signal component of the sum signal. Consequently, the generation of annoying buzzing in receiving stereophonic signals is prevented, and the elimination of the disturbing signal of the same frequency as that of the pilot signal prevents the malfunction of the MPX decoder. In the demodulation of the split carrier system, the superposition of the tuning noise of the intermediate frequency signal on the sum signal deteriorates tone quality. However, since the sum signal is demodulated by the intercarrier system and hence the difference between the video carrier and the sound carrier is always constant even if the intermediate frequency signal is subjected to FM modulation which causes tuning noise.

Although the invention has been described in its preferred form with a certain degree of particularity, it is to be understood to those skilled in the art that many changes and variations are possible in the invention without departing from the scope and spirit thereof.

What is claimed is:

1. A demodulating system for a multivoice (stereophonic) television system in which a broadcast signal has an aural signal, composed of a pilot signal, and a sum signal and a difference signal, representing the sum and difference, respectively, of separate stereo parts of an audio program, which is frequency modulated with a video signal, comprising:

a tuner for selecting a channel to receive said broadcast signal, including the sum signal and difference signal of the aural signal and the pilot signal, together with the video signal, and for frequency-converting the received signal into an intermediate frequency signal;

an IF band-pass filter for eliminating disturbance signals of adjacent channels from the intermediate frequency signal produced by the tuner frequency-converting the received signal;

a distributor for distributing the intermediate frequency signal;

an aural signal band-pass filter which filters the intermediate frequency signal given thereto by the distributor and passes only the aural signal component thereof;

a first FM detector which demodulates from the aural signal component a composite signal including the sum signal and difference signal;

a high-pass filter which receives the composite signal from the first FM detector, and arrests the sum signal and provides the pilot signal and the difference signal;

an intercarrier demodulator which receives the intermediate frequency signal from the distributor and provides a demodulated intermediate frequency signal;

an intercarrier band-pass filter which eliminates video signal components except a beat signal from the demodulated intermediate frequency signal given thereto by the intercarrier demodulator;

a second FM detector which receives the output of the intercarrier band-pass filter and provides a composite signal including the sum signal and difference signal; and a low-pass filter which receives the composite signal from the second FM detector and provides only the sum signal, wherein the intercarrier demodulator provides a beat signal of a frequency corresponding to the difference between the frequencies of a video carrier of the video signal and a sound carrier of the aural signal, the sum signal is obtained by the second FM detector by demodulating the beat signal, and the difference signal and the pilot signal are obtained by the first FM detector by demodulating the sound carrier of the aural signal component provided by the aural signal band-pass filter.

* * * * *